INVENTORS
CASIMIR W. NOWICKI
JOHN D. SCHUSTER
BY Spencer L. Blaylock
W. A. Schact
ATTORNEYS

INVENTORS
CASIMIR W. NOWICKI
JOHN D. SCHUSTER
BY
ATTORNEYS

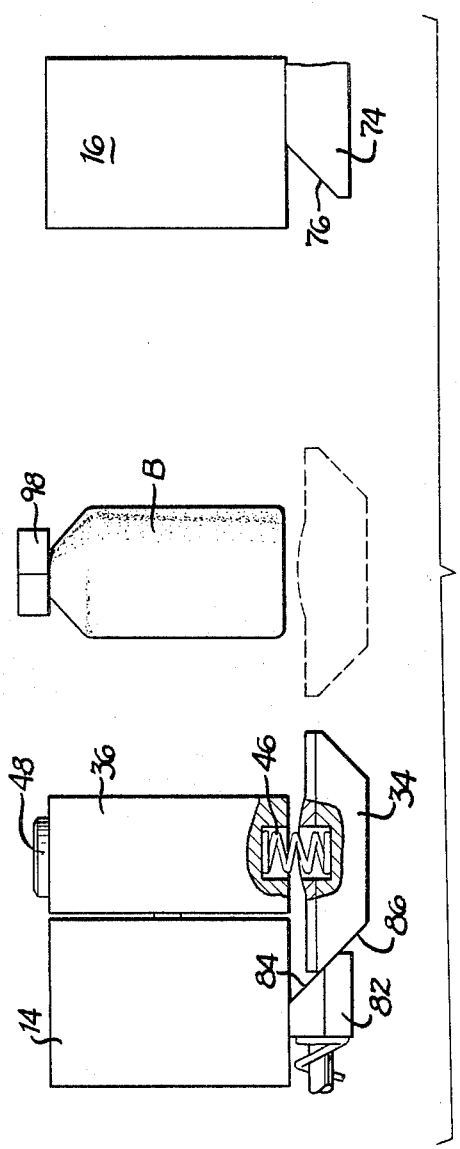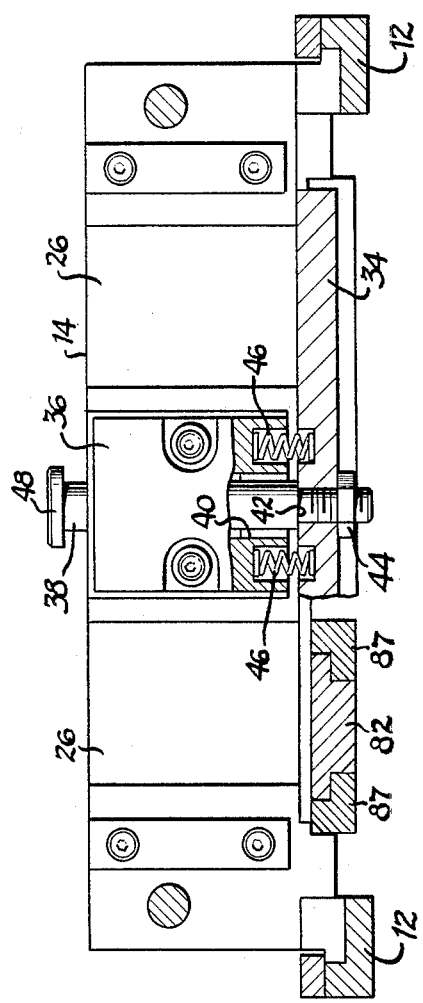

Aug. 16, 1966 — C. W. NOWICKI ET AL — 3,267,184

METHOD AND APPARATUS FOR MOLDING PLASTIC ARTICLES

Filed Dec. 4, 1963 — 4 Sheets-Sheet 4

INVENTORS
CASIMIR W. NOWICKI
JOHN D. SCHUSTER
BY Spencer L. Blaylock Jr.
W. A. Schaich
ATTORNEYS

United States Patent Office 3,267,184
Patented August 16, 1966

1

3,267,184
METHOD AND APPARATUS FOR MOLDING
PLASTIC ARTICLES
Casimir W. Nowicki, Maumee, and John D. Schuster,
Sylvania, Ohio, assignors to Owens-Illinois Inc., a corporation of Ohio
Filed Dec. 4, 1963, Ser. No. 327,929
14 Claims. (Cl. 264—97)

This invention relates to methods and apparatus for molding bottles or similar articles, and more particularly to a molding apparatus and method facilitating the separation or removal of the article from the mold in those cases where the molded article is formed with a concave bottom surface.

In the past, glass bottles having concave bottoms have been molded in mold assemblies having separable mold halves and a mold bottom plate upon which the form for producing the convex bottle bottom was mounted. After the molding of the glass bottle in the closed mold, the mold sides are retracted clear of the bottle, which remains supported upon the mold bottom plate. The molded bottle is then lifted from the bottom plate by a set of tongs.

In the molding of plastic bottles, in many cases the plastic material possesses sufficient flexibility in its molded state so that the mold assembly for the sides and concave bottom of the bottle can be formed in two halves with the bottom formation cooperatively formed by the mold halves. This arrangement can be employed where the depth of concavity in the bottle bottom is not too great, the mold halves being withdrawn sidewise from the bottle and the plastic material possessing flexibility so that the bottle bottom will flex to snap over the bottom portion of the molds as they are withdrawn.

Recent developments in the field of plastics have made available plastic materials, such as polyvinyl chloride or copolymers of polyvinyl chloride and polyvinyl acetate, which are clear or transparent in their molded state and which are suitable for use as blow-molded containers. In general, many of these clear plastic materials possess substantial rigidity in their molded state, and thus the molding of these materials into concave bottle bottoms requires a mold having a separable bottom plate.

The practice in the glass industry of employing a bottom plate which supported the molded bottle until the bottle is removed by means of tongs has certain drawbacks in the plastic field where the lower temperatures and resultant faster cooling and hardening of the plastic material lend themselves to higher production rates per forming station. At the higher production rate possible with plastic materials, the glass industry practice of employing tongs in connection with the separation of the bottle from the bottom plate unduly limits the production rate in addition to requiring the use of relatively complex tong mechanisms. Further, the underlying relationship of the bottom plate with the bottle limits to some extent the path along which the bottle can be physically carried away from the mold.

Accordingly, it is an object of the present invention to provide a method and apparatus for molding bottles or similar articles wherein the molded article can be rapidly exposed for sidewise or bottom first withdrawal from the mold.

It is another object of the invention to provide a method and apparatus for manipulating a mold bottom plate to disengage the bottom plate from the molded article simultaneously with the withdrawal of separable side elements from the molded article.

Still another object of the invention is to provide method and apparatus for manipulating a mold bottom element by movement of mold side elements toward and away from a mold closed position.

2

Other objects and features of the invention will become apparent by reference to the following specification and to the drawings.

In the drawings:

FIGURE 3 is a transverse side elevation view showing the mold assembly in its open position with a molded bottle suspended from the neck mold;

FIGURE 4 is a cross sectional view taken on line 4—4 of FIGURE 1;

The device of the present invention is adaptable generally to plastic blow molding machines, but is particularly adapted to a machine of the type illustrated in detail in the copending application, now abandoned, of Thomas R. Santelli, Serial No. 146,686, filed on October 17, 1961, and assigned to the assignee of the present invention.

Figure 1:
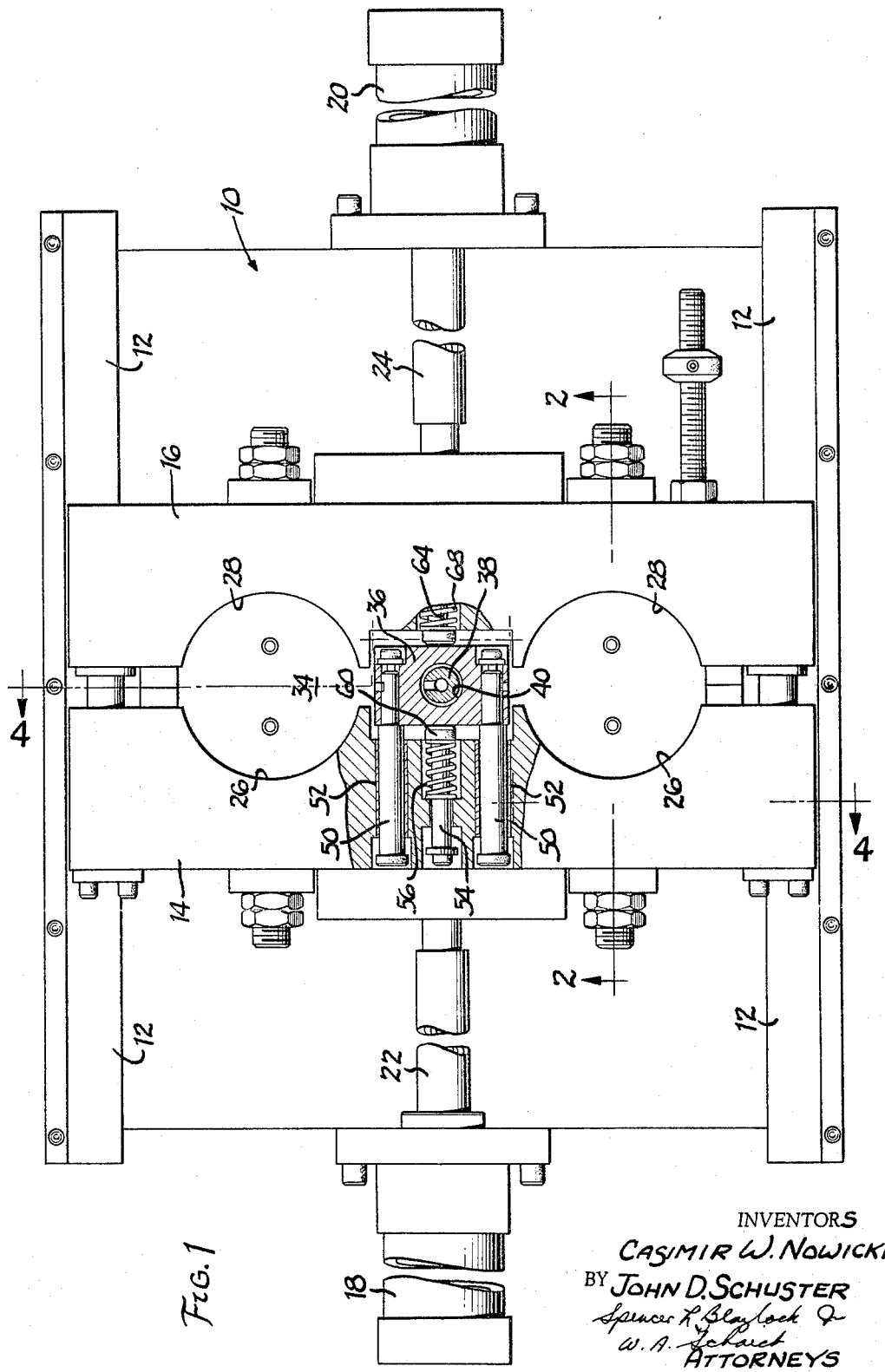
FIGURE 1 is a top plan view with certain portions omitted, broken away or shown in section, of a molding assembly embodying the present invention.

Referring first to FIGURE 1, a molding assembly embodying the present invention is constructed with a stationary frame of suitable configuration designated generally 10. A pair of parallel track assemblies 12 are fixedly mounted on frame 10 and slidably support a pair of opposed mold side platens 14 and 16 respectively, for guided movement between the mold closed position of FIGURE 1 and the mold open position shown in side elevation in FIGURE 3. A pair of hydraulic motors 18 and 20 are fixedly mounted upon frame 10, the piston rod 22 of motor 18 being connected to side platen 14 and the piston rod 24 of motor 20 being connected to side platen 16.

Motors 18 and 20 are concurrently actuated to drive platens 14 and 16 either toward or away from the mold closed position shown in FIGURE 1.

Details of a suitable motor control and platen guiding arrangement are disclosed in a copending application of Casimir William Nowicki, Serial No. 302,688, filed August 16, 1963, and assigned to the assignee of the present application.

The mold assembly shown in the drawings is operable to mold two articles at the same time, and side platen 14 is provided with two hemispherical recesses 26 while side platen 16 is provided with two opposed complementary recesses 28. Recesses 26 and 28 do not constitute the walls of a mold cavity, but instead constitutes recesses within which mold halves such as 30 and 32 (FIG. 2) may be respectively mounted by conventional means, not shown. Recesses 26 and 28 pass entirely through side platens 14 and 16 so that the recesses are open at both the top and bottom.

Figure 2:
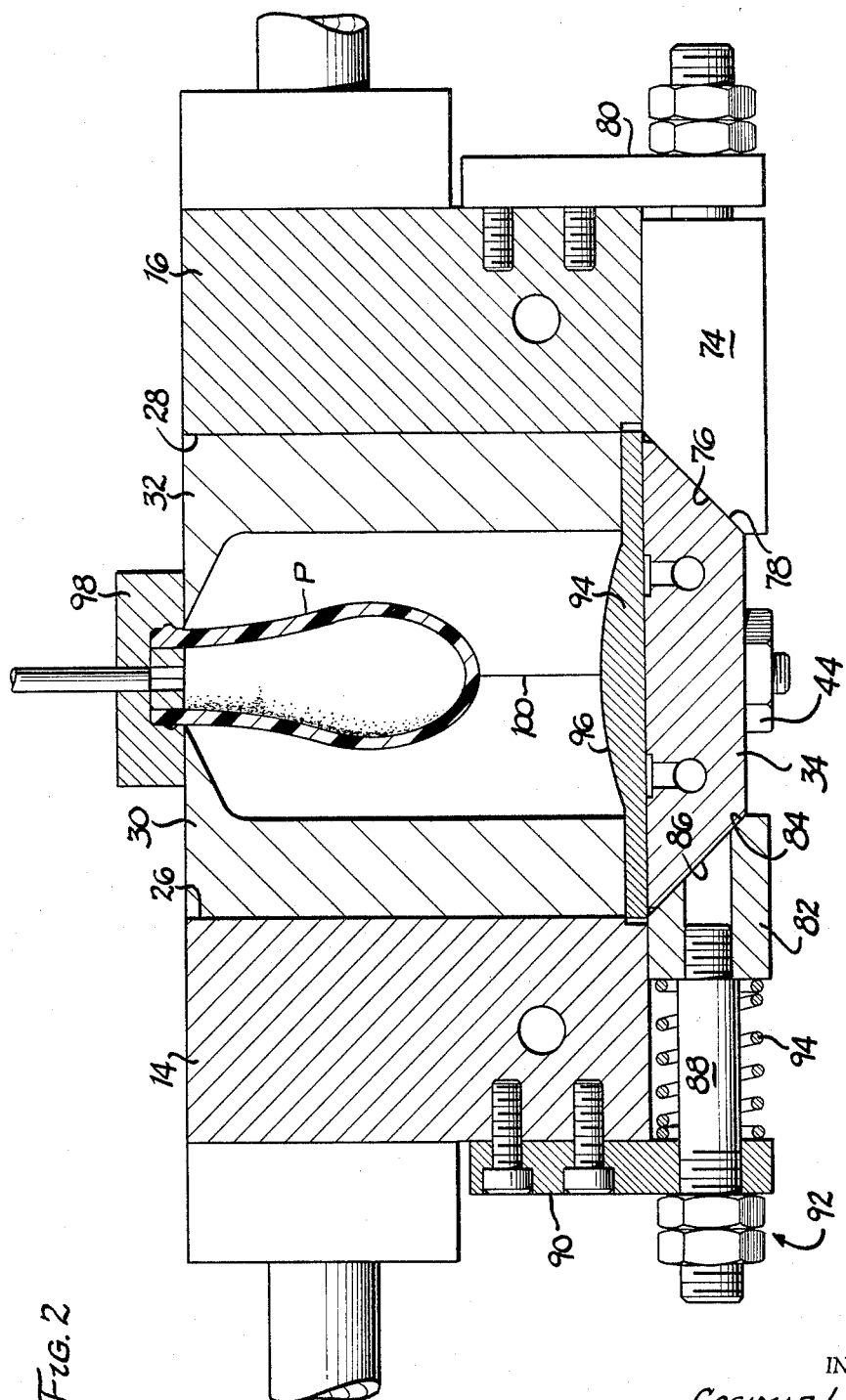
FIGURE 2 is a transverse cross sectional view taken on line 2—2 of FIGURE 1, showing the assembly of FIGURE 1 with bottle molding elements in place and with a neck mold and blowable parison in position for a blow molding operation.

Referring now to FIGURES 2 through 4, a bottom platen 34 is located between side platens 14 and 16 to underly the open bottoms of recesses 26 and 28 when the assembly is in its mold closed position. Bottom platen 34 is supported upon a carrier block 36 by a pin 38 which is mounted for vertical sliding movement within a vertical bore 40 through carrier block 36. Pin 38 is fixedly secured to bottom platen 34 between a downwardly facing shoulder 42 on pin 38 and a nut 44 threaded on the lower end of pin 38. A pair of compression springs 46 received in opposed recesses at the lower side of carrier block 36 and the upper surface of bottom platen 34 resiliently bias platen 34 downwardly away from carrier block 36, downward movement of platen 34 away from block 36 being limited by an enlarged head 48 on the upper end of pin 38.

Figure 5:
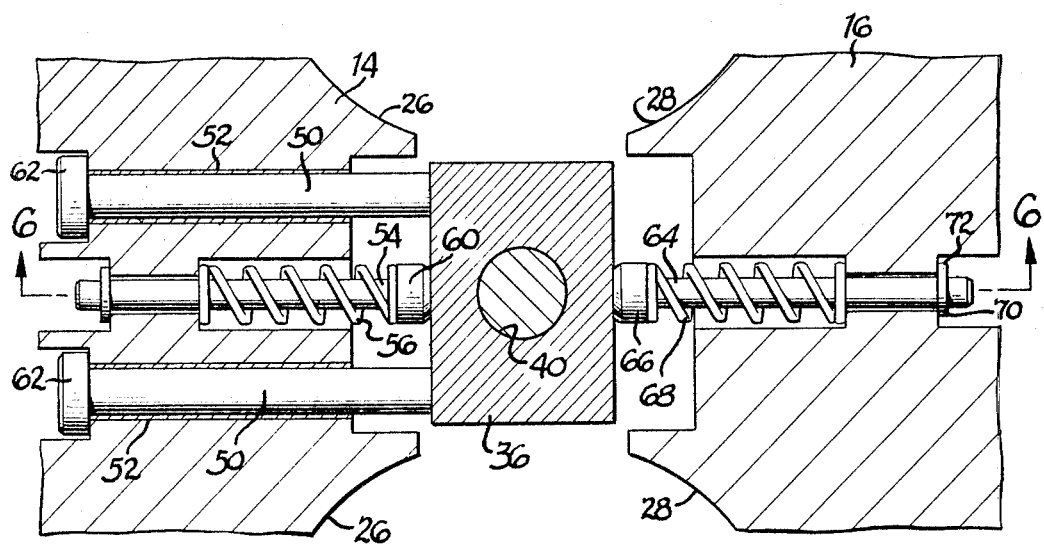
FIGURE 5 is a detailed cross sectional view taken on a horizontal plane showing details of the bottom platen supporting structure when the mold assembly is in a partially open position.

As best seen in FIGURES 1 and 5, carrier block 36 is supported upon side platen 14 by a pair of horizontal pins 50 which are fixedly secured to carrier block 36 and mounted for horizontal sliding movement in bushed bores 52 in side platen 14 to support carrier block 36 for limited horizontal movement relative to block 14 in a direction parallel to the direction of movement of side platen 14 on tracks 12. A spring biased plunger 54 is likewise supported for sliding movement in side platen 14 in a direction parallel to pins 50. A compression spring 56 is seated between the head of plunger 54 and the bottom of a bore 58 in side platen 14. Spring 56 acts through the head 60 of the plunger to resiliently bias carrier block 36 away from side platen 14 toward side platen 16. Enlarged heads 62 on the ends of pins 50 limit horizontal movement of carrier block 36 away from side platen 14, block 36 being shown at its extreme limit of movement away from side platen 14 in FIGURE 5.

A spring biased plunger 64 having a head 66 and a compression spring 68 is slidably mounted in side platen 16 and is operable when engaged with carrier block 36 to apply a biasing force against carrier block 36 which is equal and opposite to that exerted on block 36 by plunger 54. When both of plungers 54 and 64 are engaged with block 36, the plungers act as a centering means to maintain block 36 midway between platens 14 and 16 as the platens move toward or away from their mold closed position.

Figure 6:
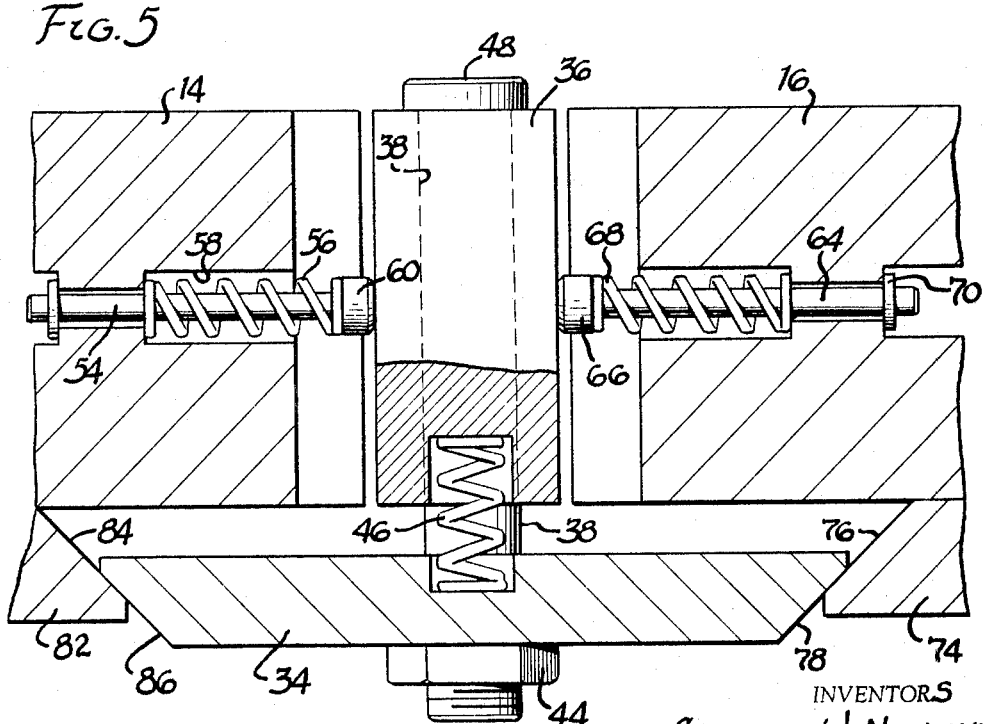
FIGURE 6 is a detailed cross sectional view taken on line 6—6 of FIGURE 5.

Referring briefly to FIGURES 5 and 6, spring biased plungers 54 and 64 are shown at the moment at which plunger 64 first engages carrier block 36 as side platens 14 and 16 move toward their mold closed position. Further movement of side platens 14 and 16 toward each other from the positions shown in FIGURES 5 and 6 is accomplished while carrier block 36 is held stationary by the equal and opposite biasing forces exerted upon it by plungers 54 and 64. Plungers 54 and 64 move simultaneously to their compressed position as the side platens 14 and 16 move to the mold closed relationship shown in FIGURE 1.

Upon opening of the mold assembly by simultaneous movement of side platens 14 and 16 away from each other from the position shown in FIGURE 1, spring biased plungers 54 and 64 hold carrier block 36 stationary in the FIGURE 1 position until platens 14 and 16 have separated to the extent shown in FIGURE 5. At this time, carrier block 36 is at its extreme limit of travel away from side platen 14 because of the engagement of heads 62 of pins 50 with the side platen. Plunger 64 has reached its maximum extension relative to platen 16, this position being determined by the engagement of a flange 70 on plunger 64 with a shoulder 72 on the rear of side platen 16. Further retracting movement of side platens 14 and 16 from each other disengages carrier block 36 from head 66 of plunger 64 and carrier block 36 moves with side platen 14 to the fully retracted position of the side platen illustrated in FIGURE 3.

Vertical movement of bottom platen 34 is coordinated with horizontal movement of side platens 14 and 16 toward and away from their mold closed position. Referring to FIGURES 2 and 6, a cam block 74 is fixedly secured to the lower side of side platen 16 and is formed with a flat upwardly and outwardly inclined cam surface 76 which is slidably engageable with a complementary inclined surface 78 on one side edge of bottom platen 34. Cam block 74 is fixedly mounted upon side platen 16 as by a bracket and bolt assembly designated generally 80.

A second camb lock 82 is mounted upon side platen 14 and is formed with a similarly inclined cam surface 84 engageable with a complementary inclined surface 86 on the adjacent side of bottom platen 34. Block 82 is supported for horizontal sliding movement beneath side platen 14 by a pair of retaining slides 87 (FIG. 4) fixed to platen 14. One or more support pins 88 are slidably mounted in a bracket 90, fixedly bolted to side platen 14, pins 88 being threaded into block 82. A lock nut adjustment designated generally 92 on pin 88 limits movement of the pin and block 82 to the right as viewed in FIGURE 2 and a relatively stiff compression spring 94 engaged between cam block 82 and bracket 90 firmly biases cam block 82 to the right as viewed in FIGURE 2.

Referring to FIGURE 5, it is believed apparent that movement of side platens 14 and 16 toward each other from the FIGURE 6 position will cause the slidably engaged inclined surfaces 76, 78 and 84, 86 to elevate bottom platen 34 as the side platens move toward each other. It will be recalled that carrier block 36, from which side platen 34 is supported, is held stationary during movement of the side platens toward each other from the FIGURE 6 position by the opposed spring biased plungers 54 and 64. Bottom platen 34 thus rises vertically from the FIGURE 6 position as side platens 14 and 16 move toward each other, this movement being guided by the vertical sliding movement of pin 38 upwardly through the vertical bore in carrier block 36.

When side platens 14 and 16 reach the mold closed position of FIGURE 1, bottom platen 34 is likewise in its mold closed position, the relationship between side platens 14 and 16 and bottom platen 34 in the mold closed position being most clearly shown in FIGURE 2. This relationship between the three platens is determined by compression spring 94 which causes cam blocks 82 and 74 to exert a supporting load to bottom platen 34 to assure a tight fit of mold bottom element 94 against mold halves 30 and 32.

Upon separating movement of side platens 14 and 16 from the FIGURE 2 position to the FIGURE 6 position, the reverse action takes place. Carrier block 36 is maintained stationary as the side platens separate from the FIGURE 2 to the FIGURE 6 position and compression springs 46 force side platen 34 to slide downwardly along inclined cam surfaces 76 and 84 from the FIGURE 2 position to the FIGURE 6 position.

After side platens 14 and 16 reach the point of separation shown in FIGURE 6, the side platens continue to retract from each other and carrier block 36 is separated from plunger 64 while inclined surface 78 on bottom platen 34 is similarly separated from inclined cam surface 76. The side platens continue to retract from each other with bottom platen 34 now supported upon carrier block 36 from the head of pin 38 and carrier block 36 in turn moving with side platen 14 until the side platens reach a point of separation such as that shown in FIGURE 3.

The present mold assembly is especially well adapted for the production of concave bottomed bottles or similar of relatively rigid plastic material. In a typical use of the apparatus disclosed, referring now to FIGURE 2, mold side halves such as indicated generally at 30 and 32 are operatively mounted respectively upon side platens 14 and 16. A mold bottom element designated 94 is mounted on the top of bottom platen 34, an upwardly convex projection 96 being provided to form the concavity in the bottle bottom.

While side platens 14 and 16 are in their retracted or mold open position, a blowable parison P of the plastic material is formed by injection molding, the parison P having an integral finish or neck portion confined in a neck mold schematically illustrated at 98. The neck mold 98, with the suspended parison P depending freely therefrom, is then positioned between the open platens 14 and 16, and the platens are moved to their mold closed position shown in FIGURE 2, neck mold 98 closing the top of the mold cavity with the parison P suspended in the cavity and mold halves 30 and 32 meeting at parting line 100. The parison P is then blown within the closed mold assembly to the shape of the bottle. A detailed description of the formation of the blowable parison, of forming the bottle finish in the neck mold and of moving the neck mold and the integral parison into the blowing position of FIGURE 2 is found in copending application, Serial No. 146,686, hereinbefore referred to.

At the conclusion of the blowing operation, hydraulic motors 18 and 20 are concurrently actuated to retract side platens 14 and 16 from each other, this action separating mold halves 30 and 32. As described above, the initial retracting movement of side platens 14 and 16 causes bottom platen 34, and the attached bottom mold element 94, to be vertically lowered away from the bottom of the molded bottle which is held stationary and suspended from neck mold 98. The amount of vertical movement of bottom platen 34 downwardly away from the bottle bottom is greater than the depth of concavity of the bottle bottom, so that when bottom platens 34 reaches the vertical position of FIGURE 6, the convex projection 96 on mold bottom element 94 is completely withdrawn from the concavity in the bottle bottom.

As described above, further movement of the side platens 14 and 16 away from each other causes bottom platen 34 to be withdrawn horizontally with side platen 14, the projection 96 on the bottom mold element passing freely clear below the bottom of the suspended bottle. At the conclusion of the retracting of side platens 14 and 16 to their mold open position shown in FIGURE 3, bottom platen 34 is horizontally withdrawn completely from beneath the molded bottle B (FIG. 3), and the molded bottle is discharged from the mold merely by releasing it from neck mold 98 to permit the bottle to drop freely clear of the mold assembly.

While we have described one embodiment of our invention, it will be apparent to those skilled in the art that the disclosed embodiment may be modified. Therefore, the foregoing description is to be considered exemplary rather than limiting and the true scope of our invention is that defined in the following claims.

We claim:

1. A method of molding a bottle having a concave bottom of a given depth of concavity from a plastic material which is substantially rigid in its molded state comprising the steps of injection molding the bottle neck portion in a neck mold and forming a blowable parison integral with the neck portion, locating the neck mold and parison in operative relationship with a blow mold having separable sides and a bottom element cooperatively defining an internal blow mold cavity of the desired bottle shape, blowing the parison within the cavity to the shape of the bottle, and exposing the bottle by holding the neck mold stationary with the bottle supported therefrom while retracting the bottom element from the bottle bottom by a distance greater than the depth of concavity, supporting the retracted bottom element on one of the blow mold sides and separating the blow mold sides from each other to withdraw the bottom element to one side of the bottle.

2. The method of molding a bottle having a concave bottom of a given depth of concavity from a plastic material which is substantially rigid in its molded state comprising the steps of injection molding the bottle neck portion in a neck mold and forming a blowable parison integral with said neck portion, locating the neck mold and parison in operative relationship with a blow mold having separable sides and a bottom element cooperatively defining an internal blow mold cavity of the desired bottle shape, blowing the parison within the cavity to the shape of the bottle, holding the neck mold stationary with the bottle supported therefrom while retracting the bottom element from the bottle bottom by a distance greater than the depth of concavity, simultaneously retracting the blow mold sides laterally from the bottle, supporting the bottom element of one of the retracting blow mold sides for movement therewith after the full retraction of said bottom element from the bottle bottom, and continuing to retract said one of said mold sides from the neck mold supported bottle until the bottom element is laterally clear of said bottle.

3. The method of molding a bottle having a concave bottom of a given depth of concavity from a plastic material which is substantially rigid in its molded state comprising the steps of injection molding the bottle neck portion in a neck mold and forming an integral parison suspended from the bottle neck portion, locating a pair of separable mold sides in a horizontally opposed mated molded position, cooperatively supporting a mold bottom plate upon the mated mold sides in an elevated molding position to define with said sides a blow mold cavity of the desired bottle shape adapted to receive said neck mold and said parison at the upper portion thereof, locating the neck mold and parison in operative relationship with said mold cavity and blowing the parison within the cavity to the shape of the bottle, holding the neck mold stationary while horizontally separating the mold sides to remove the cooperative support of the bottom element to permit said bottom element to drop away from the bottle bottom, transferring support of the bottom element to one of the separable blow mold sides after the bottom element has dropped from the bottle bottom by a distance greater than the depth of concavity, and continuing to move said one of said mold sides from said bottle until the supported bottom element is completely withdrawn from beneath the bottle supported in the neck mold.

4. The method of making a bottle or similar article having a concave bottom surface comprising the steps of molding the article in a mold assembly having separable mold side and bottom elements, manipulating the mold side and bottom elements to expose the molded article by withdrawing the mold side element directly away from the molded article along a first path, moving the mold bottom element in coordination with the withdrawal movement of the mold side element to withdraw the bottom element from the bottom of the article in a direction perpendicular to said first path during the initial portion of the withdrawal movement of the mold side element, and withdrawing the bottom element away from the article in a direction parallel to said first path during the final portion of the withdrawal movement of said mold side element.

5. The method as defined in claim 4 further comprising the steps of supporting the bottom element upon the side element after the bottom element has been withdrawn a selected distance from the bottom of the article in the direction perpendicular to said first path, and withdrawing the bottom element parallel to said first path by carrying the bottom element upon the side element during the final portion of the withdrawal movement of the side element.

6. The method of making a bottle or similar article having a concave bottom surface comprising the steps of supporting a generally horizontal mold bottom element upon an inclined surface of a mold side element to form a side and bottom of a mold assembly, molding the article in said mold assembly, withdrawing the mold side element horizontally from the molded article in a direction withdrawing the inclined surface from beneath said bottom element, maintaining the mold bottom element against horizontal movement during the initial portion of the horizontal withdrawal of said mold side element to cause said mold bottom element to move downwardly along said inclined surface away from the bottom of the article, moving said bottom element horizontally away from the article after the bottom element has been lowered a predetermined distance below the bottom of the article.

7. The method of making a bottle or similar article having a concave bottom surface in a mold assembly having separable mold side and mold bottom elements, comprising the steps of supporting a mold side element for horizontal movement away from a molding position, supporting a mold bottom element upon the mold side element for limited horizontal movement relative thereto between a normal remote position and an adjacent position wherein said mold bottom element is located during the molding of the article, locating the side element in its molding position and said bottom element in its adjacent position and molding the article, withdrawing the mold side element horizontally from the side of the molded article, maintaining said mold bottom element against horizontal movement during the initial portion of the withdrawal of said side element to thereby shift the mold bottom horizontally relative to said side element from its adjacent position to its remote position, lowering said bottom element vertically away from the bottom of the article while said bottom element is maintained against horizontal movement, and moving said bottom element horizontally with said side element until said bottom element has been horizontally withdrawn completely from beneath the molded article.

8. The method of removing a molded article having a concave bottom surface from a mold having separable side and bottom elements, the mold bottom element having an upwardly projecting convex projection thereon for shaping the concave bottom of the molded article, comprising the steps of lowering the bottom element from the molded article while suspending the article from above until the projection the bottom element is lowered clear of the bottom of the article, supporting the lowered bottom element on one of the side elements, and withdrawing said one of said side elements horizontally from the suspended article until the bottom element supported thereon has been completely withdrawn from beneath the suspended article.

9. A mold assembly comprising a mold side platen mounted for movement along a first path between a mold closed position and a mold open position, a mold bottom platen mounted upon said side platen for movement relative to said side platen along a second path normal to said first path between a mold closed position and a mold open position, said platens when concurrently in their respective mold closed positions defining side and bottom elements of a closed mold assembly, means for moving said side platen between its mold closed and mold open position, means on said side platen operable upon movement of said side platen away from its mold closed position for moving said bottom platen to its mold open position and for moving said bottom platen to its mold closed position upon movement of said side platen to its mold closed position, and means on said bottom platen operable when said bottom platen is in its mold open position for supporting said bottom platen on said side platen for movement therewith along said first path.

10. A mold assembly comprising a mold side platen mounted for horizontal movement along a first path between a mold closed position and a mold open position, a mold bottom platen mounted upon said side platen for vertical movement relative to said side platen between an elevated mold closed position and a lowered mold open position, cam means on said side platen engageable with said bottom platen for supporting said bottom platen in its mold closed position when said side platen is in its mold closed position, means for moving said side platen between its mold closed and mold open position, resilient means cooperable with said cam means on said side platen operable upon movement of said side platen away from its mold closed position for moving said bottom platen to its mold open position, and means on said bottom platen operable when said bottom platen is in its mold open position for supporting said bottom platen on said side platen for horizontal movement therewith along said first path.

11. A mold assembly comprising a mold side platen mounted for movement along a first path between a mold closed position and a mold open position, a carrier element mounted on said side platen for movement relative to said side platen parallel to said first path between opposite end limits, means for moving said side platen between its mold closed and mold open position, means responsive to movement of said side platen to its mold closed position for shifting said carrier element to one of its end limits of movement relative to said side platen and for shifting said carrier element to its opposite end limit of movement relative to said side platen upon movement of said side platen from its mold closed position to a location intermediate said mold closed position and said mold open position, a bottom platen mounted on said carrier element for movement relative to said carrier element along a second path perpendicular to said first path between a closed position and an open position, means on said side platen operable upon movement of said carrier to said one end limit for moving said bottom platen to its closed position and for moving said bottom platen to its open position upon movement of said carrier to said opposite end limit, and means on said bottom platen for supporting said bottom platen upon said carrier for movement with said side platen between said intermediate location and said mold open position.

12. A mold assembly comprising a pair of opposed mold side platens mounted for movement along a first path toward and away from each other between a mold closed position and a mold open position, a mold bottom platen located between said side platens, centering means on said side platens engageable with said bottom platen to maintain said bottom platen midway between said side platens during movement of said side platens adjacent said mold closed position, and positioning means upon said side platens engageable with said bottom platen concurrently with said centering means to shift said bottom platen along a second path normal to said first path to and from a mold closed relationship with said side platens in accordance with movement of said side platens along said first path respectively to and from said mold closed position.

13. A mold assembly comprising a pair of opposed mold side platens mounted for movement along a first path toward and away from each other between a mold closed position and a mold open position, means for concurrently moving said side platens toward or away from each other, a mold bottom platen located between said side platens, carrier means on one of said side platens supporting said bottom platen for limited movement relative to said one side platen parallel to said first path and perpendicular to said first path, centering means upon said platens for maintaining said bottom platen midway between said side platens during movement of said side platens adjacent said mold closed position, and positioning means on said side platens for shifting said bottom platen perpendicularly to said first path to and from a mold closed relationship with said side platens in accordance with the relative movement between said carrier means and said one side platen.

14. A mold assembly comprising a frame, a pair of opposed mold side platens mounted on said frame for horizontal movement along a first path toward and away from each other between a mold closed position and a mold open position, means for moving said side platens concurrently toward or away from each other, carrier means mounted on one of said side platens for limited horizontal movement relative to said one side platen, a mold bottom platen located between said side platens, means supporting said bottom platen upon said carrier means for vertical movement relative to said carrier means between an elevated molding position and a lowered open position, centering means on said side platens engageable with said carrier means to maintain said bottom platen against horizontal movement relative to said frame at a location midway between said side platens during movement of said side platens adjacent said mold closed position, and positioning means on said side platens engageable with said bottom platen for shifting said bottom platen vertically on said carrier means while said centering means are engaged with said carrier means to move said bottom platen vertically to and from its molding position in accordance with movement of said side platens to and from said mold closed position.

References Cited by the Examiner

UNITED STATES PATENTS

| | | | |
|---|---|---|---|
| 3,004,285 | 10/1961 | Hagen | 18—5 |
| 3,137,748 | 6/1964 | Makowski | 264—97 |

FOREIGN PATENTS 915,357  7/1946  France.

ROBERT F. WHITE, *Primary Examiner.*

R. B. MOFFITT, *Assistant Examiner.*